United States Patent
Garner (12) United States Patent Garner
(10) Patent No.: US 6,422,532 B1
(45) Date of Patent: Jul. 23, 2002

(54) SEVERE SERVICE VALVE POSITIONER

(75) Inventor: Ronald N. Garner, Hull, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 09/516,732

(22) Filed: Mar. 1, 2000

(51) Int. Cl.[7] .................. G05D 16/00; F16K 31/36; F16K 31/02
(52) U.S. Cl. ............... 251/129.04; 137/82; 137/85; 137/487.5
(58) Field of Search .............. 137/487.5, 82, 137/85, 482.5; 251/129.04; 91/361

(56) References Cited

U.S. PATENT DOCUMENTS

| | | | | |
|---|---|---|---|---|
| 3,799,498 A | * | 3/1974 | Wickham et al. ........... 251/129 |
| 4,021,079 A | * | 5/1977 | Bohusch ...................... 303/3 |
| 4,485,846 A | | 12/1984 | Neff |
| 4,527,583 A | | 7/1985 | Simpson |
| 4,760,859 A | * | 8/1988 | Brown ......................... 137/84 |
| 4,821,760 A | * | 4/1989 | Barnes et al. ................. 137/82 |
| RE33,028 E | * | 8/1989 | Simpson ...................... 137/82 |
| 4,901,758 A | | 2/1990 | Cook et al. |
| 4,958,938 A | * | 9/1990 | Schwartz et al. ........... 374/208 |
| D316,975 S | * | 5/1991 | Brown et al. ................. D10/46 |
| 5,219,393 A | * | 6/1993 | Niederstadt .................... 91/1 |
| 5,331,857 A | * | 7/1994 | Levine et al. ................. 73/706 |
| 5,439,021 A | * | 8/1995 | Burlage et al. ............... 137/84 |
| 5,502,999 A | | 4/1996 | Seberger et al. |
| 5,509,434 A | * | 4/1996 | Boyd et al. ..................... 137/8 |
| 5,533,544 A | * | 7/1996 | Good et al. ................... 137/85 |
| 5,564,677 A | * | 10/1996 | Levy et al. ............. 251/129.12 |
| 5,603,355 A | | 2/1997 | Miyazoe et al. |
| 5,656,782 A | * | 8/1997 | Powell, II et al. ............ 73/756 |
| 5,804,696 A | | 9/1998 | Seberger et al. |
| 5,853,027 A | | 12/1998 | Winkel et al. |
| 6,079,435 A | * | 6/2000 | Franz et al. .................. 137/82 |

* cited by examiner

Primary Examiner—Philippe Derakshani
Assistant Examiner—D. Austin Bonderer
(74) Attorney, Agent, or Firm—Fish & Richardson, P.C.

(57) ABSTRACT

A valve positioner for adjusting the position of a valve is provided. The valve positioner includes a housing having a service cartridge port and a valve connector. The valve positioner also includes a removable service cartridge having a cartridge housing received in the service cartridge port. The cartridge housing contains electronics and electro-pneumatic components associated with the valve positioner. The cartridge housing is configured such that removal does not expose the electronics and the electro-pneumatic components to an external environment.

24 Claims, 8 Drawing Sheets

SEVERE SERVICE VALVE POSITIONER

BACKGROUND

A valve positioner controls the open/closed position of a valve in response to a digital or analog electrical signal. Valve positioners may be used under a variety of conditions. For example, a valve positioner may be exposed to an environment in which a spark from the positioner could ignite explosive fumes. A severe service valve positioner is designed to operate in such conditions without initiating an explosion or other hazard.

One type of valve positioner employs an electro-pneumatic converter to convert an electrical control signal to a pneumatic signal for use in controlling the position of a valve. Often these devices are installed in potentially hazardous explosive environments. To make the devices explosion-proof, the electrical and pneumatic components may be isolated within an explosion-proof housing of the positioner. In the event that maintenance of the valve positioner is required, the electric power is disconnected and, typically, the entire device is removed from the potentially hazardous environment. This is often time-consuming and expensive.

SUMMARY

A severe service valve positioner for switching the position of a valve between an "open" position and a "closed" position is designed to operate in potentially explosive environments. The positioner includes the following components: a housing structure; a service cartridge, including an electronics compartment and an electro-pneumatic compartment; a pneumatic assembly; and a field termination assembly. The service cartridge is completely modular and detachable from the housing structure, thereby allowing the service cartridge to be removed from the valve positioner quickly and easily for service or routine maintenance.

The electronics compartment includes a controller assembly, which includes a potentiometer having a lockable setting and a reduction gear for locking the potentiometer into place and for increasing the accuracy of a measurement of the angular displacement of the potentiometer with respect to an initial position. The electro-pneumatic compartment includes a current-to-pressure converter known as an I/P motor. The electronics compartment is environmentally segregated from the electro-pneumatic compartment by an I/P cover within the service cartridge. The service cartridge, the pneumatic assembly, and the field termination assembly are physically segregated from each other by the housing structure.

In one implementation of the valve positioner, the reduction gear locks the potentiometer in place by shifting it laterally with respect to a center axis of the service cartridge. In another implementation, the reduction gear locks the potentiometer in place by shifting it axially with respect to a center axis of the service cartridge and engaging detents in the I/P motor base. The axial movement permits environmental sealing of the service cartridge to be maintained by an O-ring located between the hub of the reduction gear and the bore of the hole in the I/P motor base.

The details of one or more embodiments of the invention are set forth in the accompanying drawings and the description below. Other features, objects, and advantages of the invention will be apparent from the description and drawings, and from the claims.

DESCRIPTION

Figure 1:
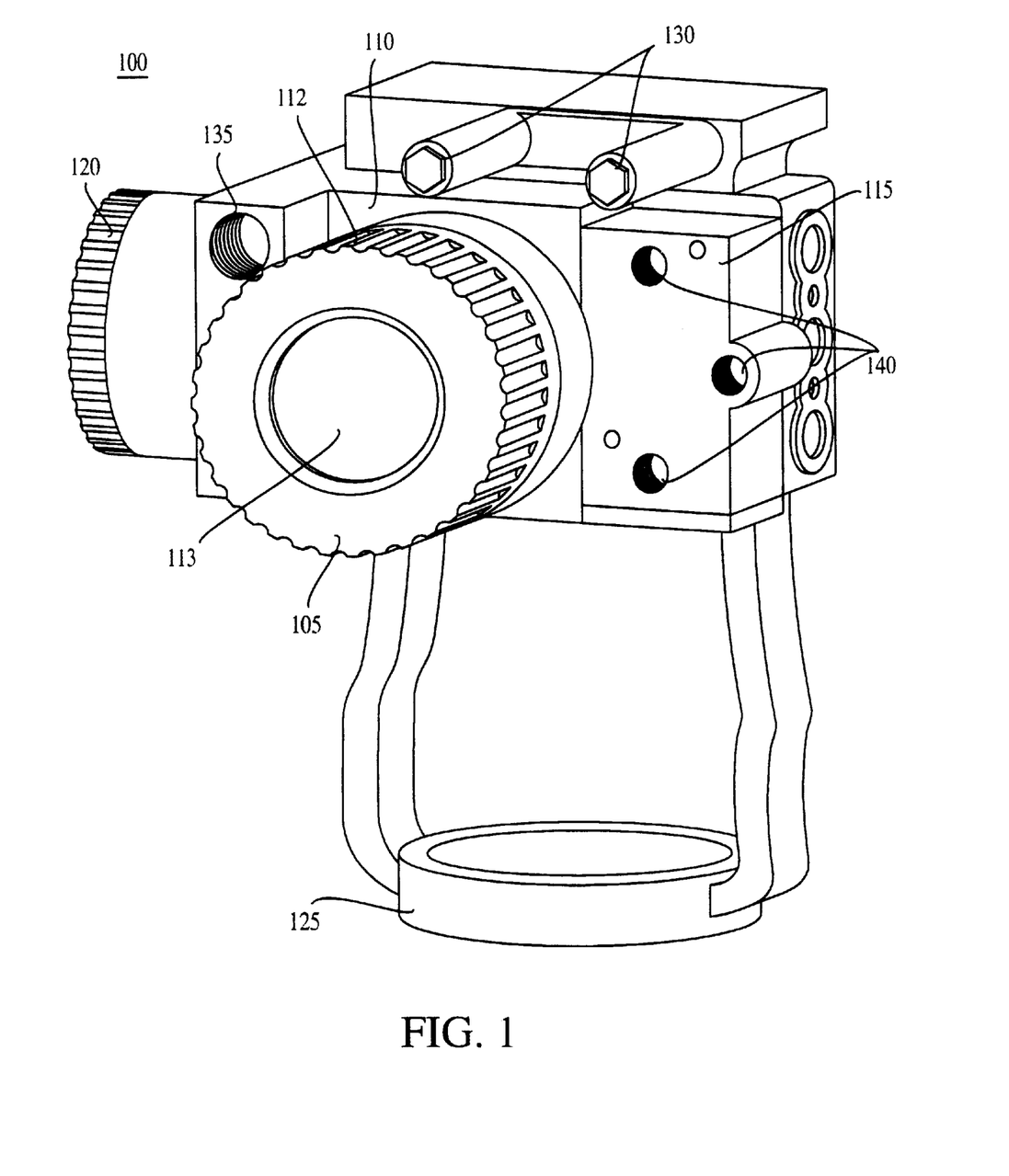
FIG. 1 is a perspective view of a severe service valve positioner.
Figure 2:
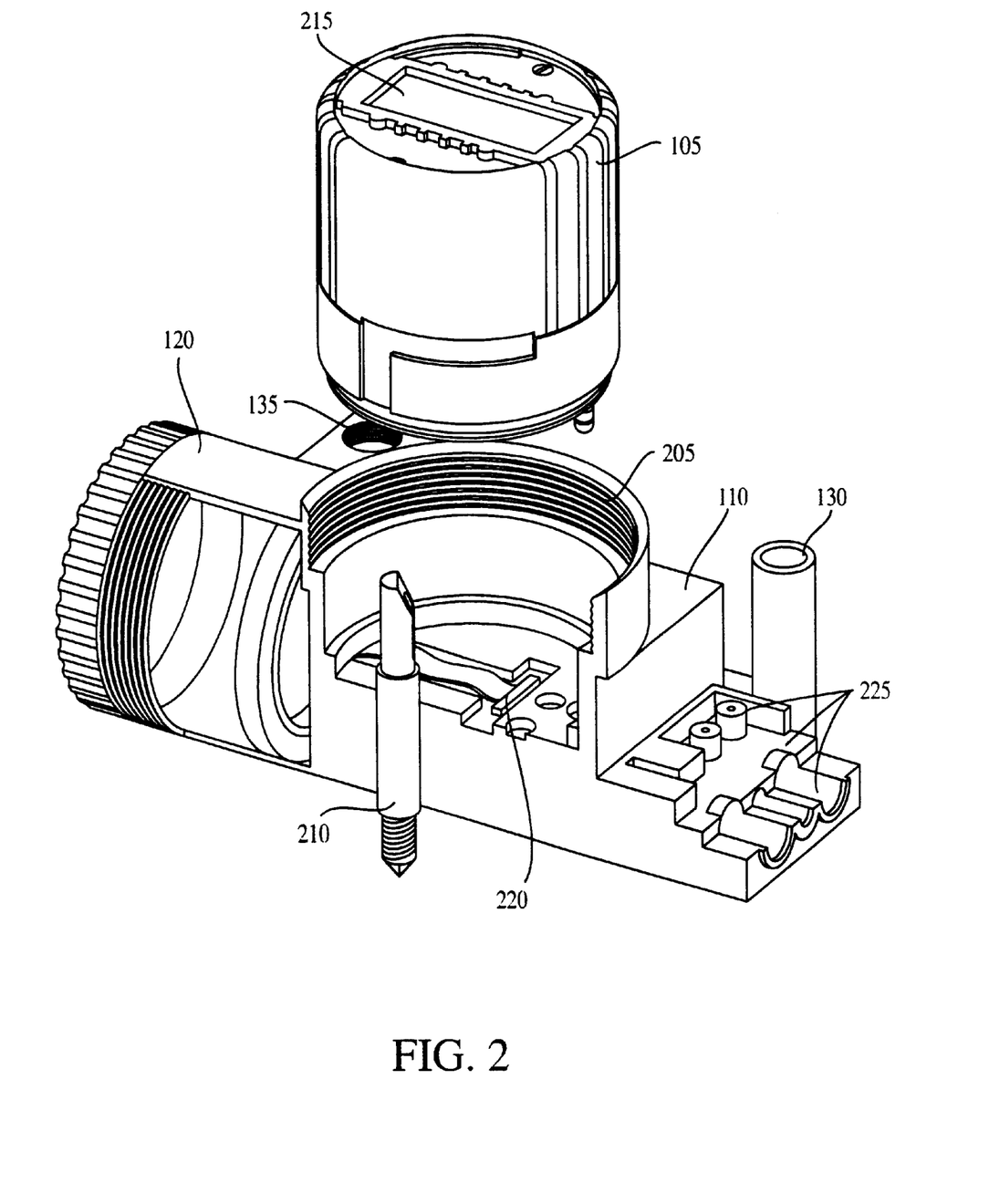
FIG. 2 is a cutaway view of the valve positioner of FIG. 1.

Referring to FIGS. 1 and 2, a severe service valve positioner 100 includes a service cartridge 105 (FIG. 2) containing electronic components and electro-pneumatic components. The service cartridge 105 is modularized and is completely detachable from a housing 110 of the positioner 100. The service cartridge 105 remains completely sealed even when it is detached from the housing 110. In use, the service cartridge is protected by a cover 112 (FIG. 1) having a glass window 113. Within the service cartridge, the electronic components and the electro-pneumatic components are environmentally segregated from one another.

The positioner 100 also includes a pneumatic module 115, including pneumatic valving, that is external to the service cartridge 105. The pneumatic module 115 is removable for service and routine maintenance.

The positioner 100 also includes a field termination assembly 120. Electrical connections to the positioner are made through the field termination assembly 120.

To enable the positioner 100 to be mounted on a valve yoke 125, the positioner 100 includes two bolting portions 130. A threaded housing portion 135 can be used for conduit wiring. The pneumatic module 115 also includes three threaded portions 140 for attaching optional pressure gauges. The entire positioner device 100 is explosion-proof, and conforms to the NEMA 4X industry standard.

As shown in FIG. 2, the service cartridge 105 may be completely detached from the positioner housing 110 by unscrewing the cover 112 from a second threaded housing portion 205. The detachment capability enables the service cartridge 105 to be removed, serviced, and reinstalled quickly and easily, which is important because the sensitive components inside the service cartridge 105 frequently require service and/or routine maintenance. As noted above, the service cartridge 105 remains sealed even when it is detached from the housing 110.

A feedback shaft 210 couples with the service cartridge 105. The operation of the feedback shaft 210 is described in greater detail below. At the top of the service cartridge, a readable display 215 shows information provided by a controller of the positioner 100. This information may include, for example, the current valve position, the desired valve position, configuration information, or diagnostic information. The display 215 is visible through the window 113.

A field termination connector 220 physically connects the field termination assembly 120 to the positioner housing 110. The field termination assembly 120 is contained in the housing 110 on the left side, and the mounting surface 225 for a pneumatic valve module is located on the right side of the housing 110. Thus, the field termination portion 120 and the pneumatic module portion 115 of the device are physically segregated from one another and from the detachable service cartridge 105. The field termination assembly 120 serves as an electrical termination point for all electrical connections to the positioner 100.

Figure 3:
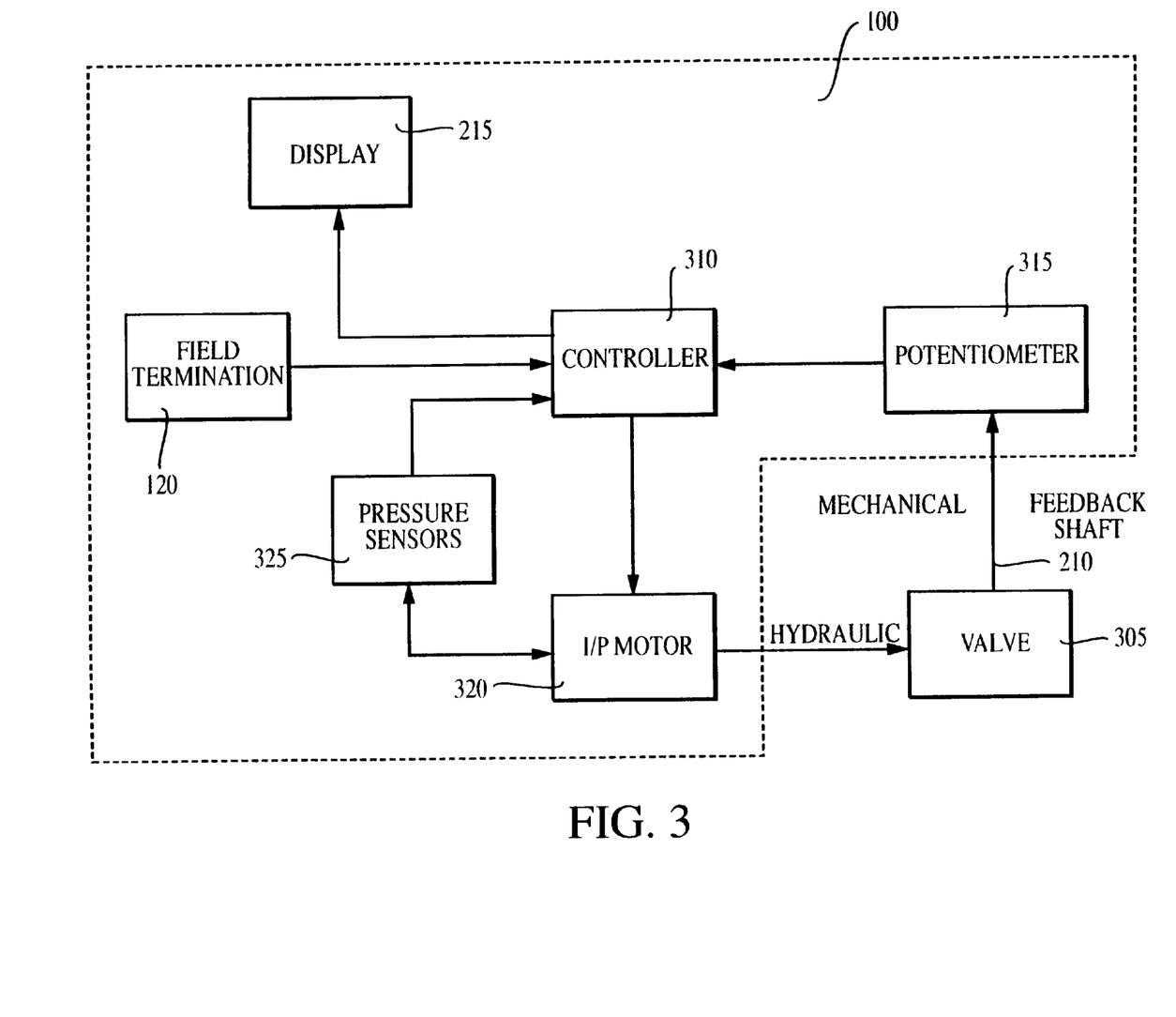
FIG. 3 is a block diagram that illustrates the operation of the valve positioner of FIG. 1.

FIG. 3 illustrates the relationship between the control components of the severe service valve positioner 100 and a valve 305. The primary control loop for the positioner consists of a controller 310, a potentiometer 315, the valve 305, and an I/P motor 320. Whenever the valve position needs to be adjusted, the controller 310 sends an electrical signal to the I/P motor 320. The I/P motor 320 converts the electrical signal into a hydraulic pressure that pneumatically adjusts the position of the valve 305. An indication of the change in valve position is provided to the controller 310 through the feedback shaft 210 and the potentiometer 315. In particular, the change in valve position rotates the feedback shaft 210, which is mechanically coupled to the valve 305. This rotation changes the resistance of the potentiometer 315, which is mechanically coupled to the feedback shaft 210 and electrically coupled to the controller 310. The controller 310 monitors the resistance of the potentiometer 315 to monitor the position of the valve 305, and adjusts the signal to the I/P motor 320 accordingly.

Pressure sensors 325, which are located in the pneumatic module 115, detect the supply pressure and the output pressure of the I/P motor 320. The controller 310 uses these values in controlling the I/P motor 320.

The display 215 may show the value of the potentiometer set point, or other parameters.

The field termination assembly 120 provides external electrical connections to the positioner 100. These connections are used to provide the controller 310 with, for example, the set point that tells the controller 310 the desired valve position.

Figure 4:
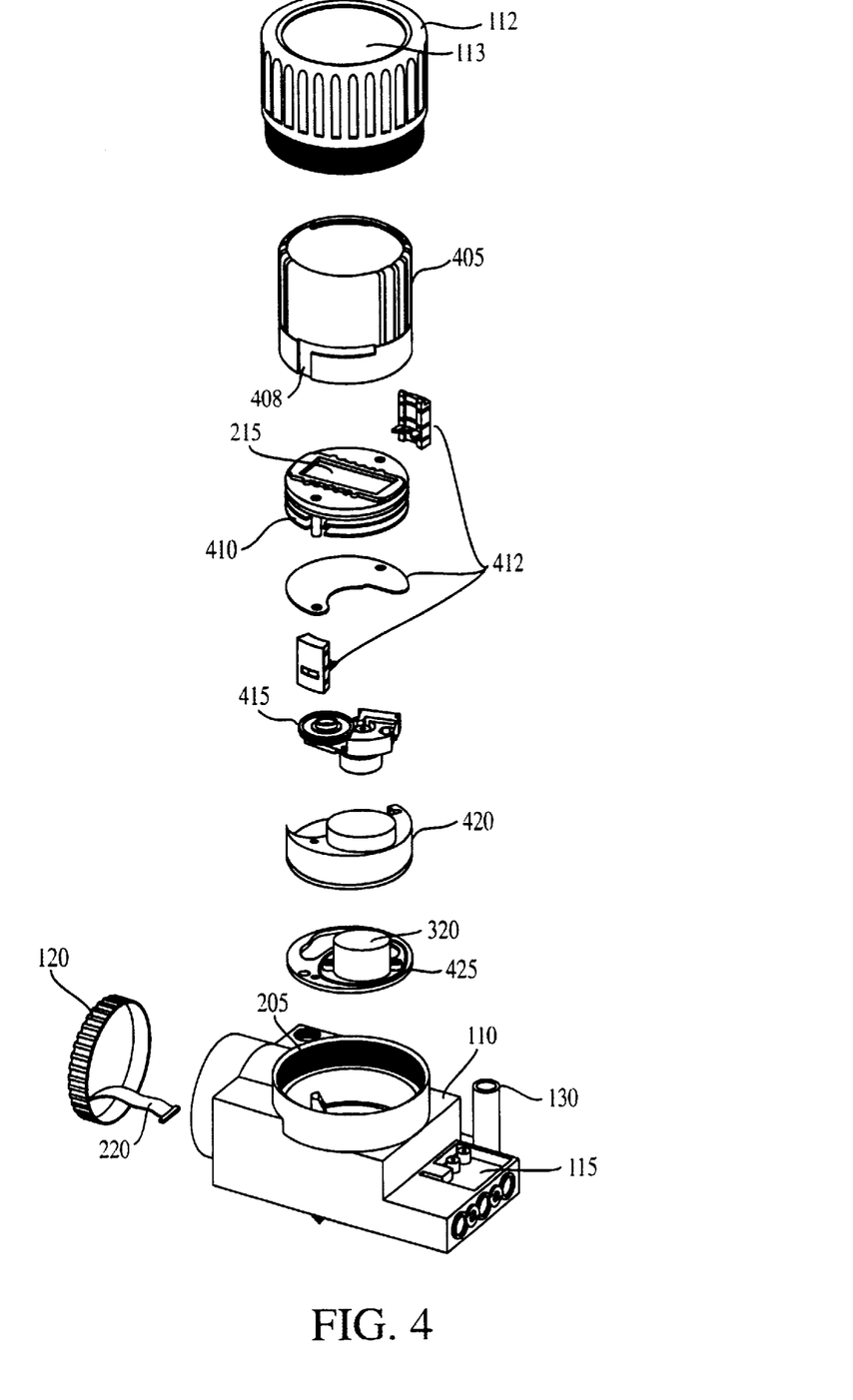
FIG. 4 is an exploded view of the valve positioner of FIG. 1.

Referring to FIG. 4, the service cartridge cover 112 and window 113 are the outermost components of the service cartridge 105. The cover 112 protects the cartridge 105, while the glass window 113 allows an observer to see the readable display 215.

The service cartridge 105 is positioned in, and freely rotatable relative to, a service cartridge casing 405. The service cartridge casing 405 includes a locking channel 408 that is used to physically couple the service cartridge 105 to the housing 110. The locking channel 408 interacts with a tab in the housing 110 to prevent the service cartridge 105 from detaching from the housing 110. The casing 405 also serves as a secondary cover.

Electronics 410 of the controller 310 are mounted on circuit boards connected to the display 215. Several molded plastic pieces 412 provide structural support for positioning components of the service cartridge 105.

A potentiometer assembly 415 includes the potentiometer 315 and related mechanical components. The potentiometer assembly 415 is described in greater detail with reference to FIG. 5A below.

The I/P motor 320 is the primary component of the electro-pneumatic compartment of the service cartridge 105. The I/P motor 320 receives an electrical signal from the controller 310, and converts this signal to hydraulic air pressure used in controlling the valve 305. An I/P motor cover 420 environmentally segregates the electronics compartment from the electro-pneumatic compartment. This environmental segregation is crucial to the ability of the positioner 100 to operate safely in hazardous environments.

The I/P motor 320 is attached to an I/P motor base 425, which has an O-ring to seal with the inside of the service cartridge casing 405. The I/P motor base 425 also serves the function of providing environmental segregation for the electro-pneumatic compartment.

In another implementation, the I/P motor 320 can be replaced with a micro valve positioner. A micro valve positioner, also known as a digital positioner, includes digitally controlled inlet and outlet ports to control the pressure in a chamber, where the pressure in the chamber then controls the position of the valve. The digital positioner provides highly precise operation, with the precision corresponding to the minimum amount of air that can be let in or out of the chamber by a single actuation of a port.

The positioner housing 110 provides a structural framework for the positioner 100. The field termination assembly 120 serves as an electrical termination point, and is physically segregated from the service cartridge 105 by the housing 110. The pneumatic module 115 is also physically segregated from the service cartridge 105 and the field termination assembly 120.

Figure 5A:
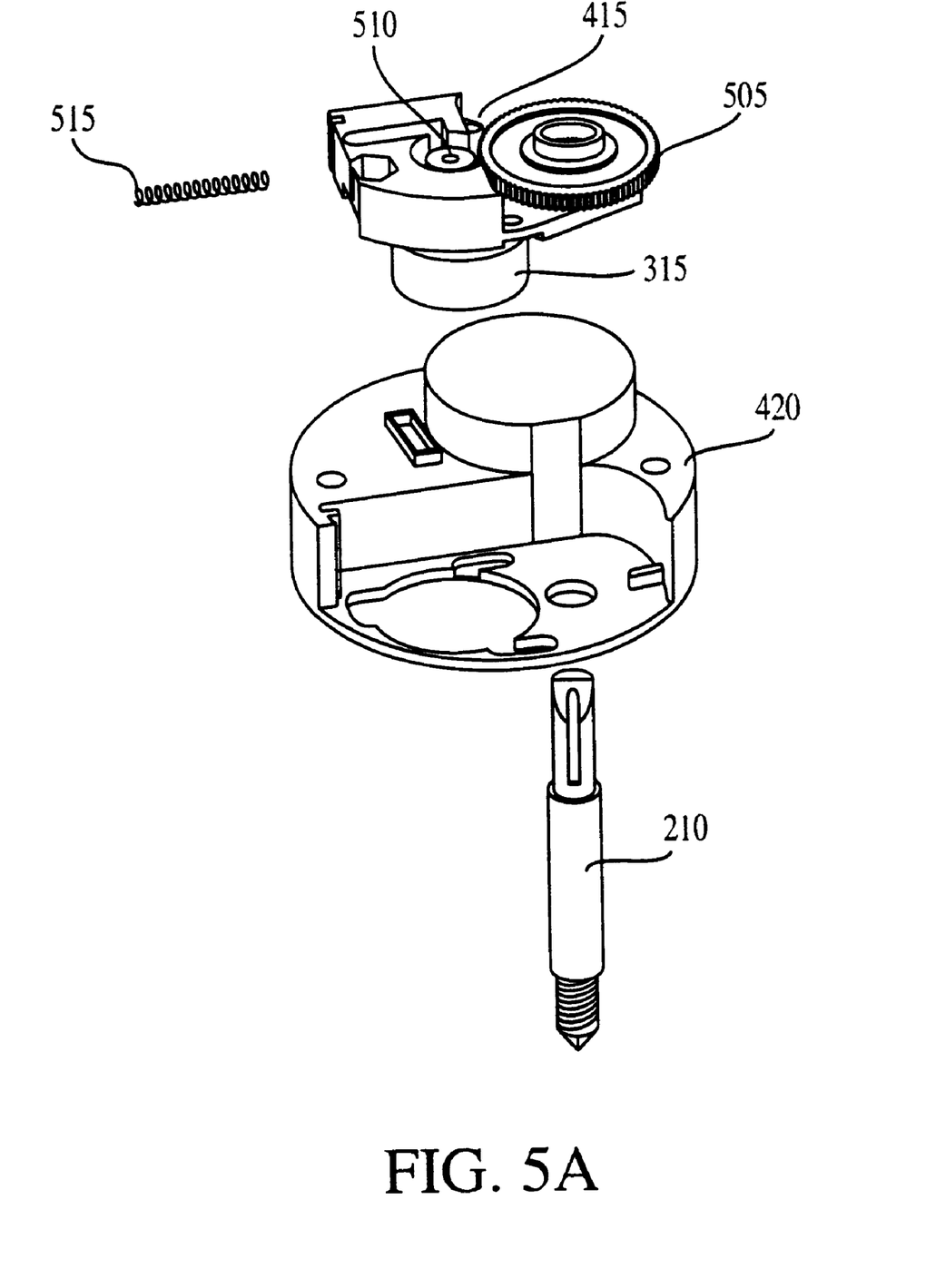
FIG. 5A is an exploded view of a potentiometer assembly portion of the valve positioner of FIG. 1.

Referring to FIG. 5A, the potentiometer assembly 415 includes the potentiometer 315 and related mechanical components. The potentiometer assembly 415 receives the feedback shaft 210, which extends from the housing 110 and is coupled to the valve stem for a rotary valve. In the case of a rotary valve, the "fully closed" position corresponds to 0 degrees, and the "fully open" position corresponds to 90 degrees. A valve rotation causes the feedback shaft 210 to rotate accordingly, and this translates into rotation of a reduction gear 505. The reduction gear 505 is coupled to an anti-backlash gear 510, for which the radius is one-third of the radius of the reduction gear 505. This ratio allows the angular displacement of the anti-backlash gear 510 to be three times that of the feedback shaft 210, thus allowing more precise angular measurements. This increased precision is important because the anti-backlash gear 510 is coupled to the shaft of the potentiometer 315 such that the angular displacement of the anti-backlash gear 510 translates directly into a change in resistance of the potentiometer 315. When the resistance of the potentiometer 315 changes, the controller 310 sends an electrical signal to the I/P motor 320 to effect a change in the valve position. A spring 515 locks the potentiometer in place when the service cartridge 105 is removed from the housing 110, thus allowing the service cartridge 105 to be removed for service or maintenance without loss of the potentiometer setting.

Figure 5B:
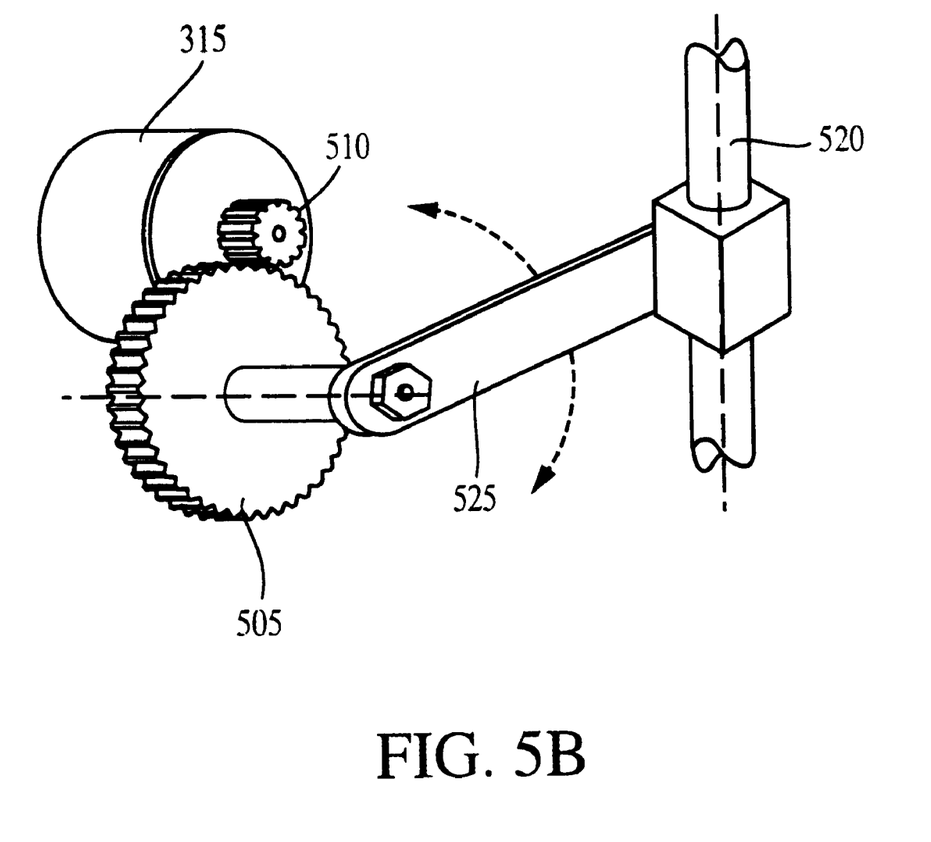
FIG. 5B is a perspective view of the interaction between the potentiometer assembly and a linear valve.

Referring to FIG. 5B, another implementation of the potentiometer assembly is coupled to a linear valve 520. Again, the reduction gear 505 serves as a three-to-one multiplier such that the movable stem of the potentiometer 315 is rotated by three degrees for each degree of rotation of the gear 505. This multiplier function increases the precision of the potentiometer measurement by increasing the range of resistances associated with the range of movement of the valve stem 520. Up and down movement of the valve stem 520 causes the attached lever 525 to move in an arc. The maximum range of angular displacement of the lever 525 is approximately 80 degrees. Because the reduction gear 505 is directly coupled to the lever 525, its range of angular rotation is the same as the range of angular displacement of the lever (i.e., a maximum of about 80 degrees). Because the radius of the reduction gear 505 is three times the radius of the anti-backlash gear 510, the angular rotation of the anti-backlash gear 510 is three times that of the reduction gear 505. The anti-backlash gear 510 is coupled to the shaft of the potentiometer 315 such that the rotation of the anti-backlash gear 510 translates directly into a change in resistance in the potentiometer 315.

The reduction gear 505 also has a locking mechanism that physically locks the potentiometer 315 into place. In one implementation, the reduction gear locking mechanism causes the potentiometer 315 to move laterally into the locked position. Another implementation allows the locking mechanism to cause the potentiometer 315 to move axially along the central axis of the service cartridge 105. The hub of the reduction gear 505 is provided with an O-ring that is compressed against the I/P motor base 425 to seal the electronics compartment from the electro-pneumatic compartment. This seal is maintained despite the axial movement required to lock and unlock the reduction gear 505.

The potentiometer assembly 415, including the potentiometer 315, is physically placed on the topside of the I/P motor cover 420, while the I/P motor 320 is located on the other side of the cover. Thus, the I/P motor cover 420 serves to environmentally segregate the electronic components (i.e., the potentiometer assembly 415 and its components) from the electro-pneumatic components (i.e., the I/P motor 320). This construction effectively prevents any inadvertent spark from the electronic components from igniting in the potentially hazardous environment that may surround the electro-pneumatic components.

The feedback shaft 210 passes through the I/P motor cover 420 to permit connection of the shaft to both the potentiometer assembly 415 and the valve 305.

Figure 6:
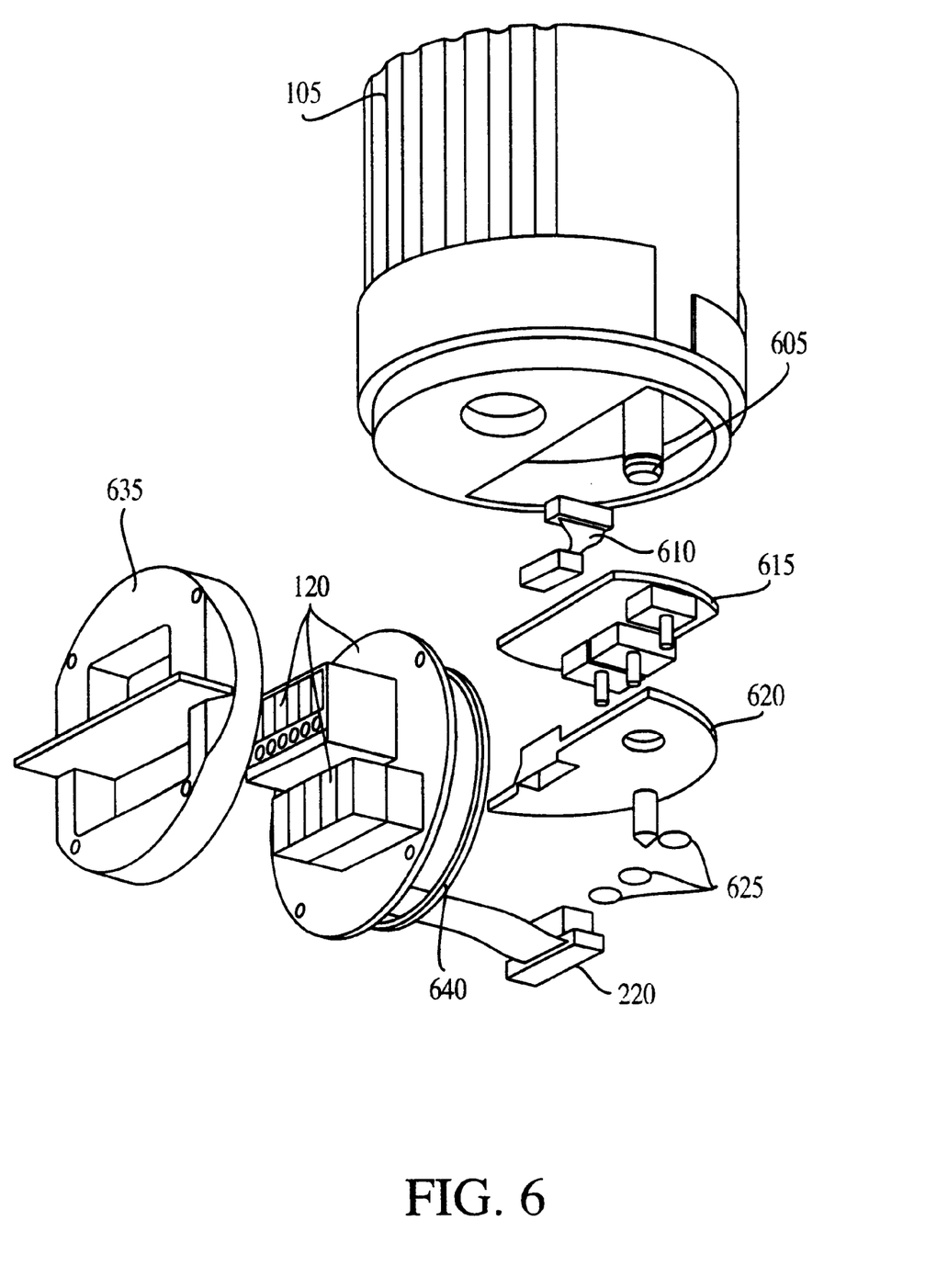
FIG. 6 is an exploded view of a pressure sensor assembly portion of the valve positioner of FIG. 1.

Referring to FIG. 6, a molded boss 605 with an internal channel and integral to the I/P motor base 425 is provided with an O-ring and mates with a recess in the housing 110. The boss 605 thus enables the I/P motor 320 to be driven even though the motor itself is sealed off from the rest of the device. A connector cable 610 provides an electrical connection between the service cartridge 105 and the rest of the positioner 100. A printed wiring board 615 carries pressure sensors. A first pressure sensor detects the input air pressure being supplied to the I/P motor 320, a second pressure sensor detects the output air pressure generated by the I/P motor 320. The sensors provide the pressure measurement information to the controller 310. A molded support and guide 620 for the pressure sensor assembly physically supports the pressure sensor assembly within the positioner housing structure 110. O-rings 625 insulate the pressure sensor assembly from the positioner housing 110 to improve measurement accuracy. The field termination assembly 120 is external to the service cartridge 105. A pressure ring 635 serves as a collar nut, in that it compresses an O-ring 640 between the field termination assembly 205 and the rest of the positioner 100, thereby sealing off the field termination assembly 120 from the other positioner components.

Figure 7:
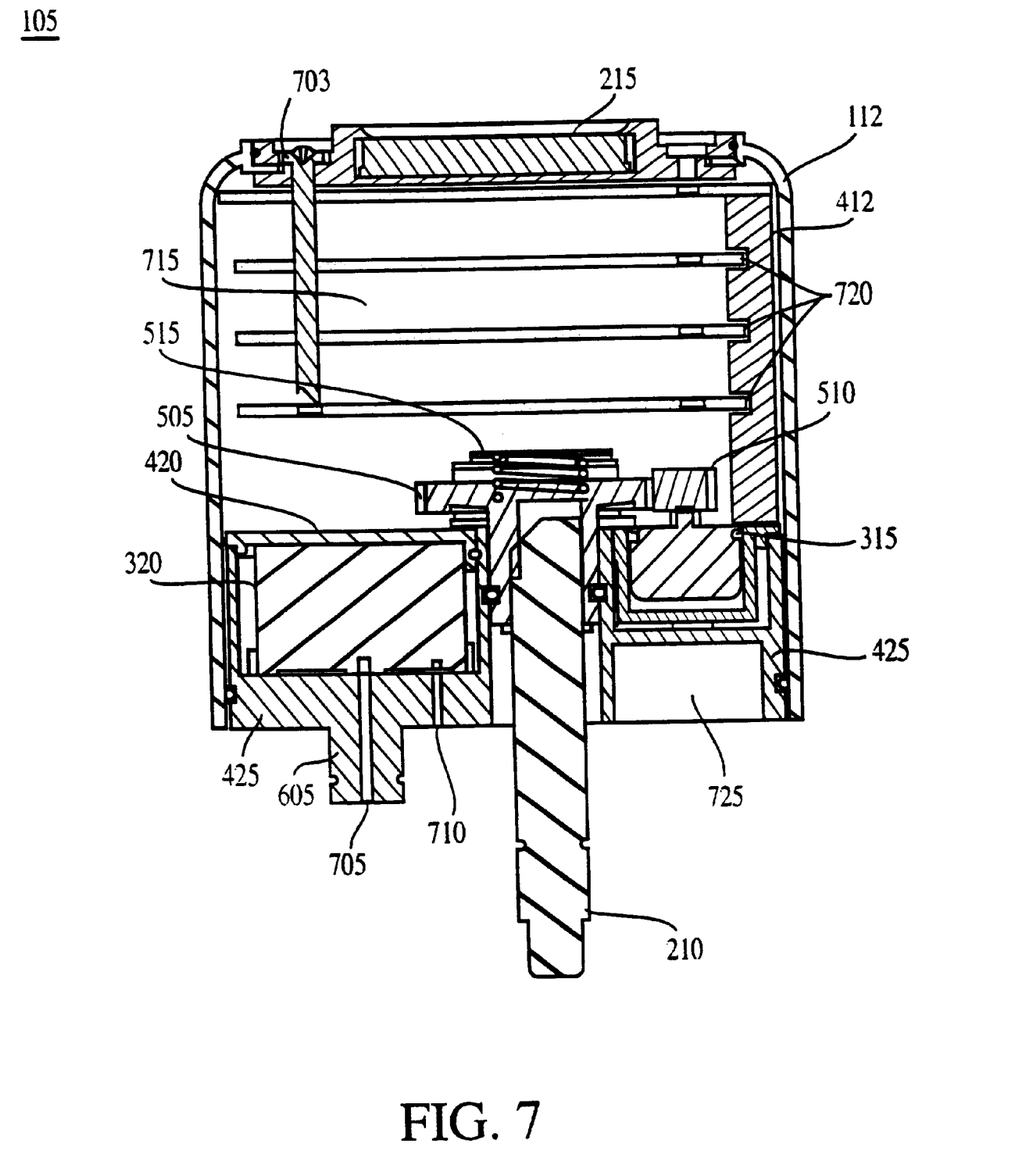
FIG. 7 is a cross-sectional side view of a service cartridge of the valve positioner of FIG. 1.

Referring to FIG. 7, a cross-sectional view illustrates the fully assembled service cartridge 105 with the feedback shaft 210 in place. A screw 703 binds the assembly together.

The I/P motor 320 regulates a very small airflow. Air from a supply channel 705 in the housing 110 enters the I/P motor 320 and must be exhausted to the outside by an exhaust channel 710. The exhaust air is segregated from the electronics compartment 715 by the I/P motor cover 420. The electronics compartment 715 contains circuit boards 720, the potentiometer 315, the reduction gear 505, and the anti-backlash gear 510.

The pressure sensors present a particular problem in that, if one pressure sensor ruptures, the entire service cartridge chamber could become pressurized, which would greatly increase the potential explosion pressures. To eliminate the pressurization problem, the pressure sensors are located in a recess in the bottom side of the I/P motor base 425. The pressure sensors are environmentally isolated from the electronics compartment 715 by the O-ring in the I/P motor base 425. When the assembled service cartridge 105 is installed in the housing 110, the pressure sensor recess and the interior of the housing make a separate chamber 725. The I/P motor exhaust air enters this chamber through a hole in the I/P motor base 425 and exits through a hole 710 in the housing 110. Sintered metal flame arrestors are used in all air passages entering and leaving the housing 110. In general, these flame arrestors are cylindrical, with a diameter of 0.25 inches and a length of 0.25 inches. Because the pressure sensor chamber 725 is vented to the outside, the interior of the valve positioner 100 will not become pressurized in the event of a pressure sensor rupture.

The I/P motor exhaust air is intentionally channeled into the pressure sensor chamber 725. Corrosion protection for the pressure sensors is achieved by purging with the exhaust air from the I/P motor 320. Corrosion protection for the electronics compartment 715 is achieved by sealing the electronics compartment 715 within the service cartridge 105 and isolating the electronics compartment 715 from air circulation.

The environmental segregation of the electronics compartment, the electro-pneumatic compartment, the pneumatic compartment, and the field termination assembly provides the main safety mechanism for the positioner 100. In particular, the segregation of the electronics compartment (i.e., the potentiometer assembly 415) from the electro-pneumatic compartment (i.e., the I/P motor 320) by the I/P motor cover 420 effectively prevents any inadvertent spark from the electronic components from igniting in the potentially hazardous environments that may be present within the electro-pneumatic components. The modularity and detachability of the service cartridge 105 provides the ease of use for required service and routine maintenance while allowing the potentiometer setting to remain constant and thereby minimizing interruption of operations.

Other embodiments are within the scope of the following claims.

What is claimed is:

1. A valve positioner for adjusting the position of a valve, the valve positioner comprising:

a housing, including a service cartridge port and a valve connector; and a removable modular service cartridge, including a cartridge housing received in the service cartridge port of the housing, and containing electronics and electro-pneumatic components of the valve positioner, the cartridge housing being sealed such that removal does not expose the electronics or the electro-pneumatic components to an external environment, wherein the electronics comprise a potentiometer assembly.

2. The valve positioner of claim 1, wherein the potentiometer assembly comprises a potentiometer having a rotatable drive gear and a reduction gear engaged with the drive gear, the reduction gear being operable to rotate the potentiometer.

3. The valve positioner of claim 2, wherein the potentiometer has a lockable setting.

4. The valve positioner of claim 3, wherein the potentiometer assembly includes a spring mechanism operable to lock the potentiometer in place by shifting the potentiometer laterally with respect to a center axis of the service cartridge.

5. The valve positioner of claim 2, wherein the reduction gear is rotated by a feedback shaft connected to the valve.

6. The valve positioner of claim 2, wherein drive gear is an anti-backlash gear.

7. The valve positioner of claim 2, wherein a radius of the reduction gear is larger than a radius of the drive gear to increase the angular displacement of the potentiometer with respect to the angular displacement of the reduction gear, as the reduction gear rotates the drive gear.

8. The valve positioner of claim 7, wherein the angular displacement of the potentiometer with respect to an initial position is proportional to a change in resistance in the potentiometer.

9. The valve positioner of claim 8, wherein the change of resistance in the potentiometer is compared to a set point to determine the extent to which the valve position is to be adjusted.

10. A valve positioner for adjusting the position of a valve, the valve positioner comprising:
    a housing;
    a service cartridge including an electronics compartment and an electro-pneumatic compartment;
    a pneumatics assembly; and
    a field termination assembly, wherein the electronics compartment and the electro-pneumatic compartment are environmentally segregated from one another such that the service cartridge can be operated safely in potentially explosive environments, and the electronics compartment comprises a potentiometer assembly.

11. The valve positioner of claim 10, wherein the potentiometer assembly comprises a potentiometer having a rotatable drive gear and a reduction gear engaged with the drive gear, the reduction gear being operable to rotate the potentiometer.

12. The valve positioner of claim 11, wherein the potentiometer has a lockable setting.

13. The valve positioner of claim 12, wherein the potentiometer assembly includes a spring mechanism operable to lock the potentiometer in place by shifting the potentiometer laterally with respect to a center axis of the service cartridge.

14. The valve positioner of claim 11, wherein the reduction gear is rotated by a feedback shaft connected to the valve.

15. The valve positioner of claim 11, wherein the drive gear is and anti-backlash gear.

16. The valve positioner of claim 11, wherein a radius of the reduction gear is larger than a radius of the drive gear to increase the angular displacement of the potentiometer with respect to the angular displacement of the reduction gear, as the reduction gear rotates the drive gear.

17. The valve positioner of claim 16, wherein the angular displacement of the potentiometer with respect to an initial position is proportional to a change in resistance in the potentiometer.

18. The valve positioner of claim 17, wherein the change of resistance in the potentiometer is compared to a set point to determine the extent to which the valve position is to be adjusted.

19. A valve positioner for adjusting the position of a valve and operable to function in potentially explosive environments, the valve positioner comprising:
    a housing structure having a service cartridge port;
    a service cartridge including an electronics compartment and an electro-pneumatic compartment, the service cartridge being modular and detachable from the housing structure;
    the electronics compartment including a controller assembly having a potentiometer and a reduction gear for increasing the accuracy of a measurement of the angular displacement of the potentiometer;
    the electro-pneumatic compartment including a current-to-pressure converter operable to position the valve;
    a cover portion disposed between the electronics compartment and the electro-pneumatic compartment for environmentally segregating the current-to-pressure converter from the electronics compartment;
    a pneumatics interface module disposed adjacent the service cartridge port, the pneumatics interface module being environmentally segregated from the service cartridge by the housing structure; and
    a field termination portion integrally formed with the housing structure, the field termination portion being environmentally segregated from the service cartridge and the pneumatics interface module by the housing structure.

20. The valve positioner of claim 19, further including a spring mechanism operable to lock the potentiometer in place by shifting the potentiometer laterally with respect to a center axis of the service cartridge.

21. A valve positioner for adjusting the position of a valve and operable to function in potentially explosive environments, the valve positioner comprising:
    a housing structure having a service cartridge port;
    a service cartridge including an electronics compartment and an electro-pneumatic compartment, the service cartridge being modular and detachable from the housing structure;
    the electronics compartment including a controller assembly having a potentiometer and a reduction gear for increasing the accuracy of a measurement of the angular displacement of the potentiometer;
    the electro-pneumatic compartment including a microvalve positioner operable to position the valve;
    a cover portion disposed between the electronics compartment and the electro-pneumatic compartment for environmentally segregating the microvalve positioner from the electronics compartment;
    a pneumatics interface module disposed adjacent the service cartridge port, the pneumatics interface module being environmentally segregated from the service cartridge by the housing structure; and
    a field termination portion integrally formed with the housing structure, the field termination portion being environmentally segregated from the service cartridge and the pneumatics interface module by the housing structure.

22. The valve positioner of claim 21, further including a spring mechanism operable to lock the potentiometer in place by shifting the potentiometer laterally with respect to a center axis of the service cartridge.

23. A valve positioner for adjusting the position of a valve and operable to function in potentially explosive environments, the valve positioner comprising:
    a housing structure having a service cartridge port;
    a service cartridge including an electronics compartment and an electro-pneumatic compartment, the service cartridge being modular and detachable from the housing structure;
    the electronics compartment including a controller assembly having a potentiometer and a reduction gear for increasing the accuracy of a measurement of the angular displacement of the potentiometer;

the electro-pneumatic compartment including a digital positioner operable to position the valve;

a cover portion disposed between the electronics compartment and the electro-pneumatics compartment for environmentally segregating the digital positioner from the electronics compartment;

a pneumatics interface module disposed adjacent the service cartridge port, the pneumatics interface module being environmentally segregated from the service cartridge by the housing structure; and a field termination portion integrally formed with the housing structure, the field termination portion being environmentally segregated from the service cartridge and the pneumatics interface module by the housing structure.

24. The valve positioner of claim 23, further including a spring mechanism operable to lock the potentiometer in place by shifting the potentiometer laterally with respect to a center axis of the service cartridge.

* * * * *